United States Patent [19]
Burdorf et al.

[11] 3,980,253
[45] Sept. 14, 1976

[54] CASSETTE LOADING APPARATUS

[76] Inventors: Donald L. Burdorf, 2652 Vista Drive, Newport Beach, Calif. 92660; Robert L. Gertz, 25012 Ericson Way, Laguna Hills, Calif. 92653

[22] Filed: Aug. 16, 1974

[21] Appl. No.: 498,036

[52] U.S. Cl. .............................. 242/192; 242/198; 360/96
[51] Int. Cl.² ................... G11B 15/32; G11B 23/10
[58] Field of Search ........... 242/192, 197, 198, 200, 242/199, 210, 71.1, 180, 181; 360/93, 96

[56] References Cited
UNITED STATES PATENTS

| | | | |
|---|---|---|---|
| 3,499,619 | 3/1970 | Newell | 242/192 |
| 3,604,656 | 9/1971 | Hollingsworth | 242/192 |
| 3,807,651 | 4/1974 | Furst | 242/192 |

*Primary Examiner*—George F. Mautz
*Attorney, Agent, or Firm*—Johnston, Keil, Thompson & Shurtleff

[57] ABSTRACT

A cassette loading mechanism for use in conjunction with a tape transport apparatus in which the take-up and supply reels are simultaneously driven by surface engagement of a capstan with the outermost tape layer on each reel. The loading mechanism enables a hinged protective cassette containing a supply reel to be easily loaded into the tape transport apparatus and made ready for threading with only three simple actions to be performed by the operator. First, depending on the particular embodiment, the cassette is loaded into either a cassette tray or into a pocket in a hinged door directly over the take-off shaft. Second, pushing down, either on the cassette itself or on the hinged door, accomplishes the simultaneous snapping of the hub within the cassette onto the supply shaft and the releasing of the locks holding the cassette closed. Finally, the sliding of a single knob opens the cassette and advances the supply tape pack until brought into contact with the driving capstan. Removal of the cassette with the tape therein after use is accomplished by the reversal of the above operations.

6 Claims, 10 Drawing Figures

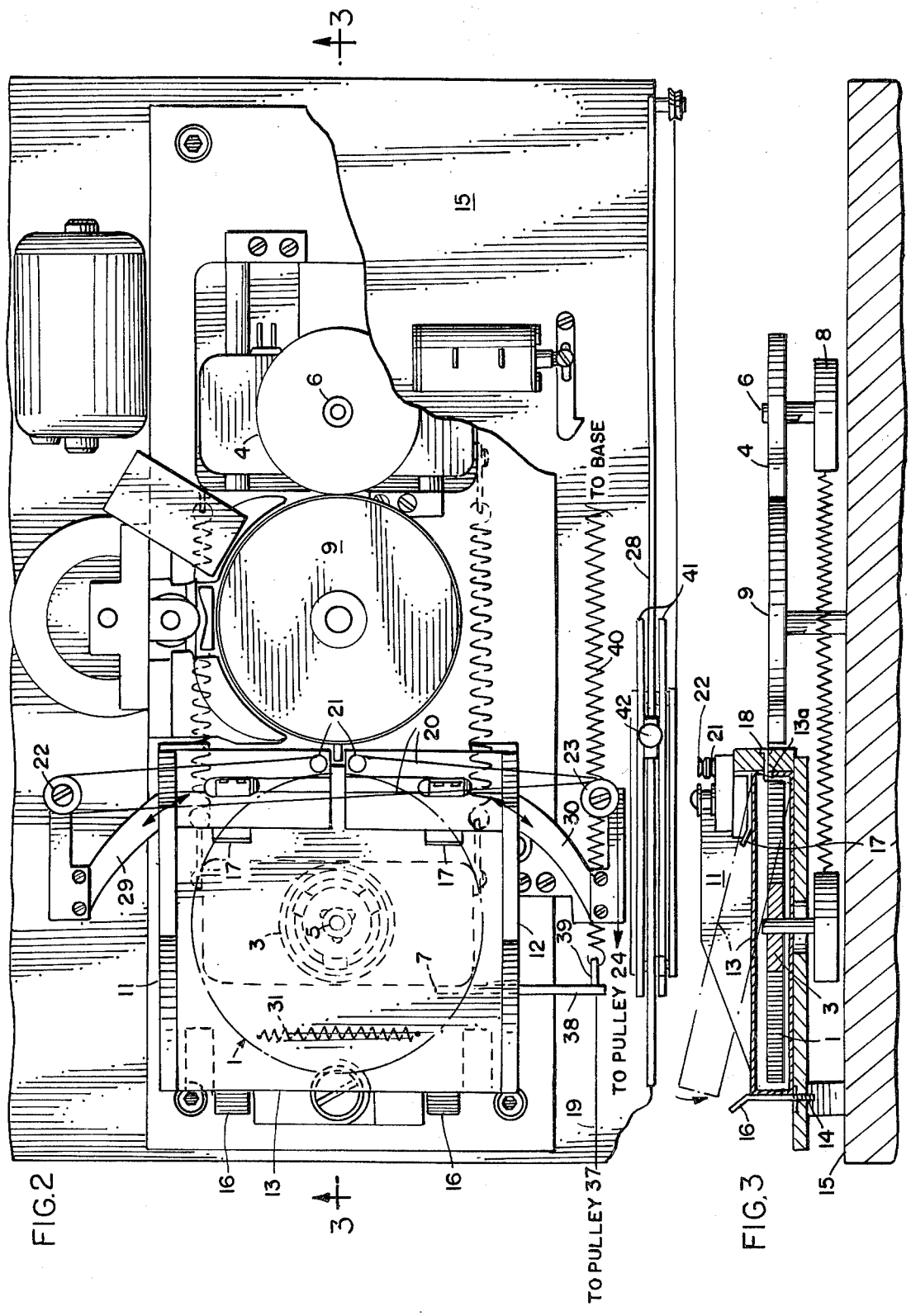

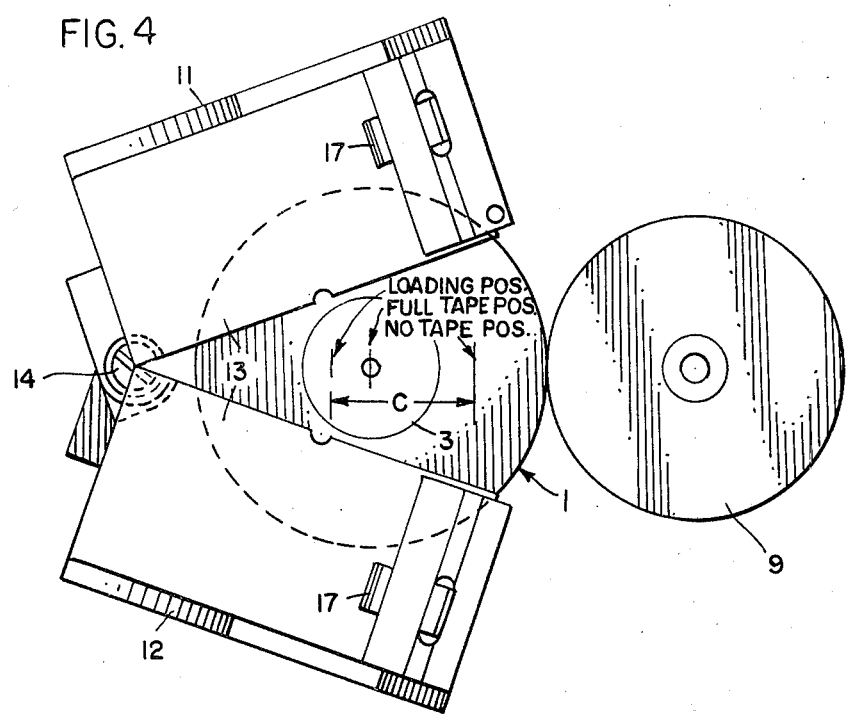
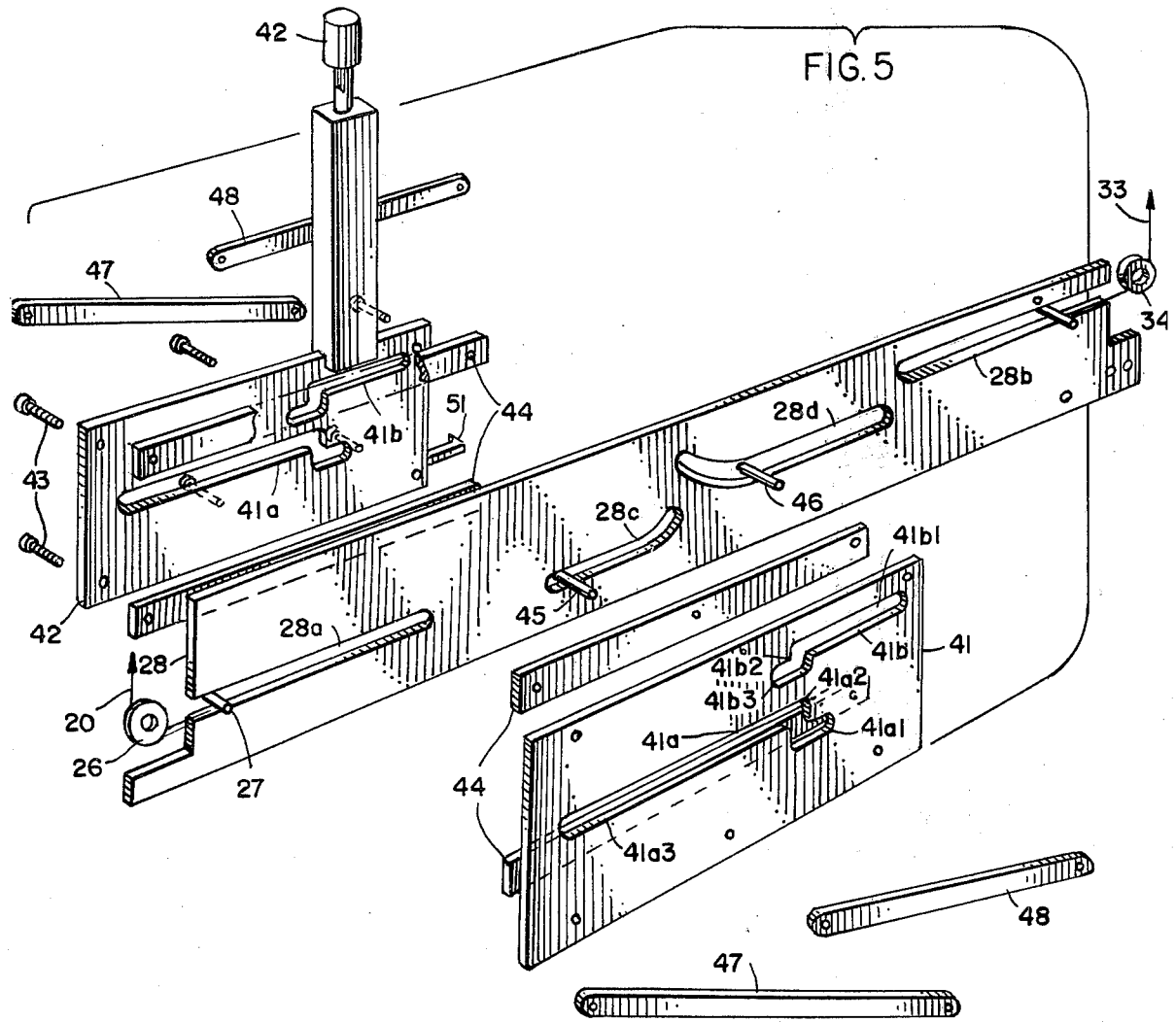

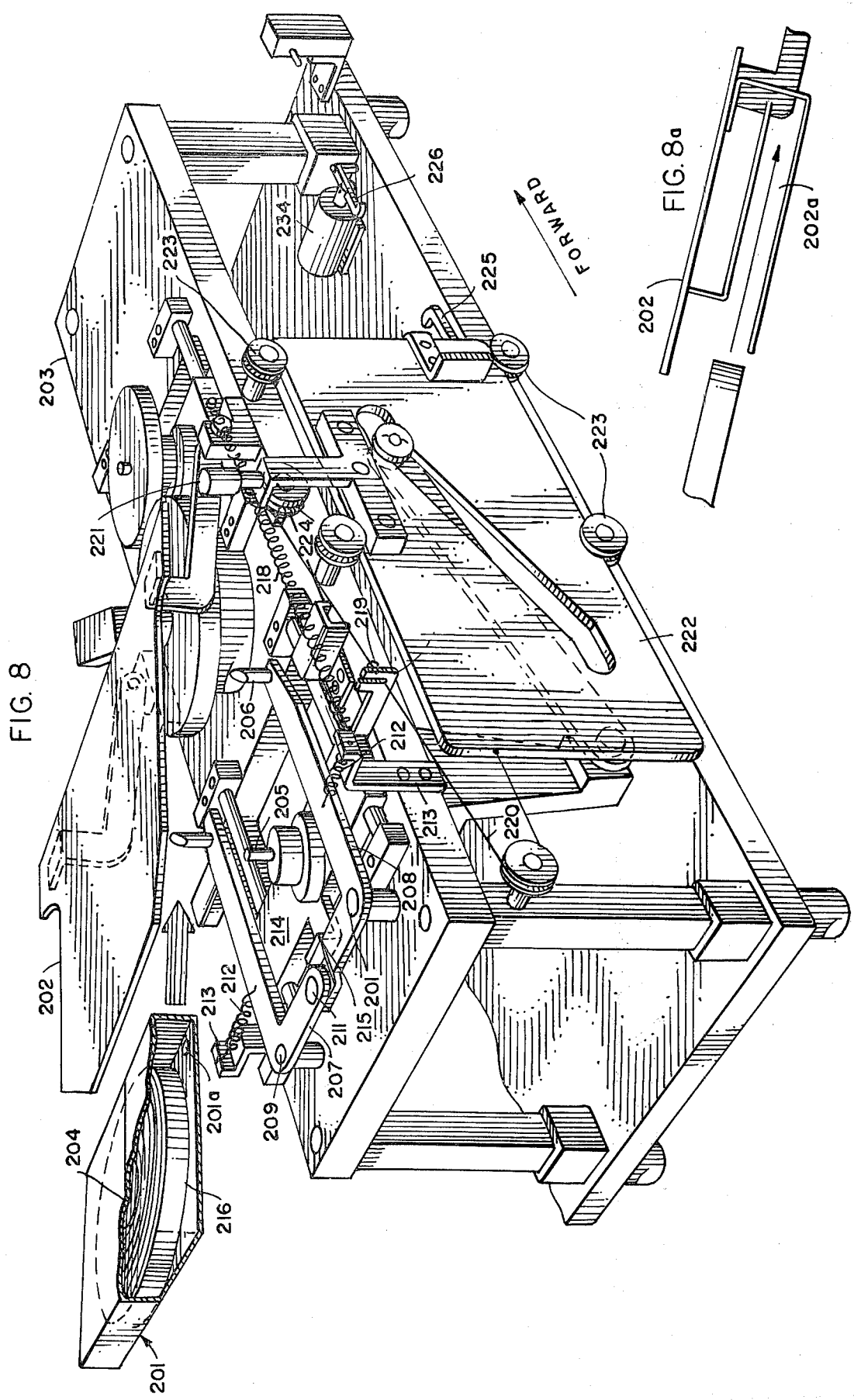

3,980,253

CASSETTE LOADING APPARATUS

BACKGROUND OF THE INVENTION

The invention relates to the simplified loading of a hinged protective cassette containing a hub with magnetic tape wound thereon into a tape transport apparatus of the type known, for example, through U.S. Pat. No. 3,370,803 and through U.S. Pat. No. 3,921,933, the disclosure of which is incorporated herein by reference. In these tape transports packs are wound on and unwound from hubs on shafts which are rotatably mounted upon carriages slideable towards and away from the capstan as the diameter of the supply tape pack decreases and that of the take-up tape pack increases during the tape transporting operation, these two carriages being urged towards and the tape packs being driven by the capstan.

In order to load tape onto such a transport unit it is necessary that several steps be performed in a specific sequence. The carriage upon which the shaft for the supply hub is mounted must be retracted against the above mentioned spring forces urging it towards the capstan far enough to permit the hub with the tape pack to be snapped onto the shaft without interference with the capstan. The retraction must be even further, of course, if the supply hub and tape pack are housed within a protective cassette at the time when the hub is snapped onto the shaft. This is likely to be the case, since a major purpose of such a cassette is to protect the tape pack and to provide easy handling, making it desirable that the tape remain within the cassette as long as possible and, therefore, as the tape is initially loaded into the tape transport apparatus. Given the presence of a cassette, another required step is the gaining of access to the tape once the hub (still within the cassette) is snapped onto the supply shaft and ready for advancement towards the capstan. Once the protective cassette is unlocked, it is desirable that access to the tape be prevented to minimize the possibility of damage to the tape, so a lock on the access door through which or into which the cassette was inserted should be actuated to prevent opening the door. Finally, the supply reel must be advanced toward and come in contact with the capstan in order to be driven therefrom in the subsequent threading and recording operations.

As can be seen from the operations listed above, loading a tape pack within a cassette involves several sequenced steps which require not only a certain degree of knowledge on the part of the operator but also a certain degree of care to prevent damage to the tape and/or transport unit from improper loading. The present invention has been developed in order to simplify and expedite the loading (and unloading) process by means of a dependable and not unduly complex mechanism.

OBJECTS OF THE INVENTION

An object of the present invention is to provide an apparatus and a method for dependably loading or unloading cassettes containing recording tape into or from tape transport units with a minimum of operator effort.

A further objective of this invention is to provide an apparatus and method to automatically sequence the cassette loading operation to eliminate the possibility of incorrect loading which might prevent the proper operation of the unit or which might cause damage to the recording tape and/or the tape transport unit.

A further objective of this invention is to provide an apparatus and method to permit the loading of a supply reel of recording tape into the tape transport unit without having to first remove the tape from the protective cassette and thereby subjecting it to possible damage through accident or operator mishandling.

A further objective of this invention is to provide an apparatus and method for conveniently using a supply reel housed in a locked protective cassette with a drive unit of the type having a capstan to directly drive moveable supply and take-up reels, a type particularly suitable for high speed video tape applications.

A further objective is to provide a method and device which prevents the accidental, inadvertent or even intentional opening of the door when the tape is not completely wound on the supply hub and safely enclosed in the cassette.

Other objects, features and advantages of the invention will be readily apparent from the description of preferred embodiments thereof, taken in conjunction with the accompanying drawings.

THE DRAWINGS

FIG. 2 is a plan view of the closed cassette loaded into the cassette tray.

FIG. 3 is a side view of the cassette as it is loaded into the cassette tray.

FIG. 4 is a plan view of the opened cassette with the supply reel advanced to contact the capstan.

FIG. 5 is an exploded view of the components of the sliding actuator mechanism for the first embodiment.

FIG. 8 is a perspective view of a third embodiment of the invention shown with the tape transport unit.

FIG. 8a is a partial view showing the insertion of the cassette of the third embodiment.

BRIEF DESCRIPTION OF THE INVENTION

In two advantageous embodiments of this invention, after the manual insertion of a cassette containing a supply reel of tape into the receptacle in the tape transport unit and the snapping of the hub (still within the cassette) onto the retracted supply shaft, the sliding of a knob sequentially performs the distinct operations of (1) locking the door through which the cassette was inserted (2) opening the cassette (which was unlocked by the snapping on of the hub) and (3) advancing the supply reel into contact with the capstan.

A third advantageous embodiment integrates some of the above operations. First, the snapping of the supply reel onto the supply shaft and the unlocking of the hinged cassette are accomplished by the closing of the door into a pocket of which the cassette has been inserted. Second, the sliding of a knob similar to that used in the first embodiments simultaneously opens the cassette and advances the supply reel to contact the capstan. In addition, the opening of the cassette automatically locks the door.

The systems of cam followers, links, cables, pulleys, springs and associated hardware utilized to accomplish the sequenced events by sliding of the knobs in the three embodiments are discussed in detail below.

DETAILED DESCRIPTION OF THE INVENTION

First Embodiment

Figure 1:
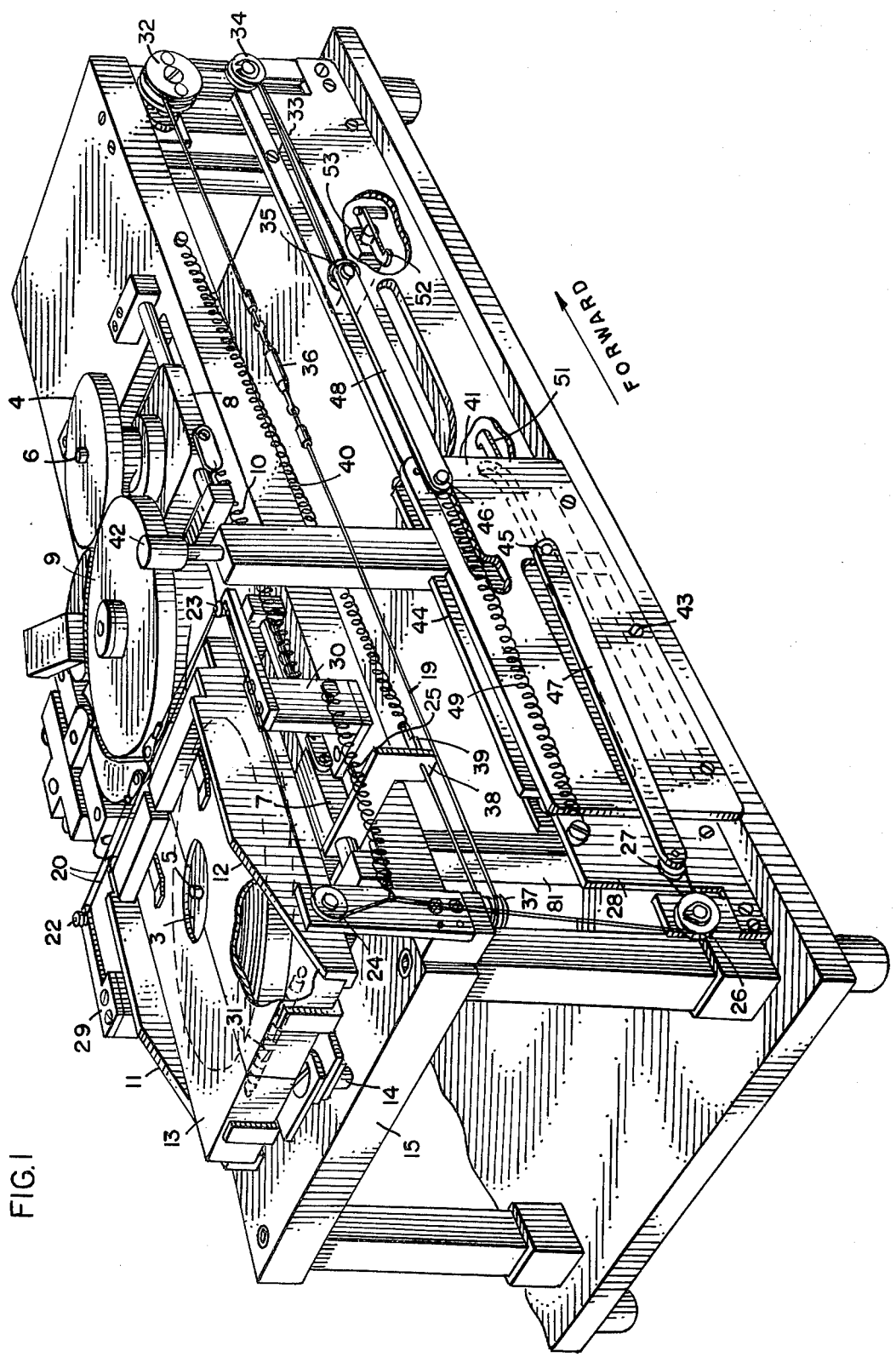
FIG. 1 is a perspective view of one embodiment of the loading apparatus shown in conjunction with a tape transport unit.

The first embodiment of the invention is shown pictorially in FIG. 1 in conjunction with the tape transport unit. The tape transport unit, as mentioned above, can be of the the type taught by Newell in U.S. Pat. No. 3,370,803 in which tape from supply reel 1 is unwound from and wound on hubs 3 and 4 on shafts 5 and 6 which are rotatably mounted on carriages 7 and 8 slideable towards and away from capstan 9 as the diameter of the supply reel 1 decreases and that of the take-up reel resulting on hub 4 increases during the tape transporting operation, carriages 7 and 8 being urged towards capstan 9 by springs 10. The cassette tray comprising halves 11 and 12 is hinged at pin 14 which is fixedly attached to upper base 15. The hinged casset 13 in which supply reel 1 on hub 3 is stored and transported is shown in the loaded position by dotted lines.

The first operation in the loading process, a manual one, is inserting the cassette 13 into the cassette tray. FIGS. 2 and 3 illustrate the path of cassette 13 as it is loaded into place. Spring guides 16 urge the cassette forward as spring guides 17 urge the cassette downward. As the front edge of the cassette is moving forward pins 18 enter holes 13a in the front edge of the cassette 13 thereby unlatching the locking device (not shown) which otherwise keeps the hinged halves of the cassette 13 together. In addition, as cassette 13 is lowered into position, hub 13 within the cassette is snapped onto shaft 5 which, as explained below, is held in the proper orientation with respect to cassette tray halves 11 and 12 by cable 19. Having snapped hub 3 onto shaft 5 and unlatched cassette 13, the next operations to be performed are, first, opening the now unlocked cassette and, second, advancing the supply carriage 7 to allow the outermost layer of tape on tape pack 1 to engage the capstan 9. These operations are now discussed in order.

The cassette 13 is opened and closed by cable 20. As FIG. 2 indicates, the two ends of cable 20 are attached to cassette tray halves 11 and 12 by screws 21. Tracing cable 20 from the end attached to tray half 11, it is routed around pulleys 22, 23 and 24, through the end of spring 25, around pulley 26, around follower 27, back around pulley 26, back through the end of spring 25, back around pulleys 24 and 23 and finally attached to tray half 12. The pulleys 22, 23, 24 and 26 are all rotatably but otherwise stationarily mounted. Follower 27 is constrained to travel in slot 28a of cam plate 28, shown in FIGS. 1 and 5. As is readily apparent from the above cable system, the movement of cam follower 27 forward will cause the cassette tray halves 11 and 12 to open pivoting about pin 14 and sliding along cassette tray slides 29 and 30, respectively. Moving follower 27 backward will allow the cassette tray halves to close under the force of spring 31, the ends of which are attached to the undersides of cassette tray halves 11 and 12. The other end of spring 25 is attached to cassette slide 30 and acts to keep cable 20 taut to prevent it from jumping out of the various pulley sheaves. The means by which the movement of follower 27 is controlled is discussed below following the explanation of the means for advancing and retracting carriage 7—the second operation which must be performed after the cassette 13 is in place and unlocked.

Advancing and retracting carriage 7 to allow the outermost tape layer of tape pack 1 to engage the capstan 9 is also accomplished by means of a cable system. Beginning at step-up pulley 32, where one end of cable 33 is attached so as to wind around the larger of the two sheave diameters, cable 34 is routed around pulley 34, around follower 35, back around pulley 33, and back to the point of attachment at step-up pulley 32. One end of cable 19 is attached to the smaller of the two sheave diameters. Tracing cable 19 from the pulley 32 point of attachment, it is routed through an adjusting turnbuckle 36, around pulley 37, through arm 38 and terminates at stop 39 which provides the restraining force keeping carriage 7 in the proper orientation to cassette tray halves 11 and 12. Stop 39 is in turn attached to one end of spring 40, the other end is attached to upper base 15. As is apparent from the above discussion as follower 35, which is constrained to move in slot 28b of cam plate 28 (shown in FIGS. 1 and 4), is allowed to move forward a distance $x$, carriage 7 will advance toward the capstan 9 a distance $(x) \times (A/B)$ where A/B is the size ratio of the small sheave to the large sheave of pulley 32. As is also apparent, if cam follower 35 is allowed to advance more than a distance of $(C) \times (B/A)$ where C is the distance (shown in FIG. 4) between the loading position of shaft 5 and the position of shaft 5 after substantially all of the tape has been wound off hub 3, there will be no interference of stop 39 with arm 38 as the tape transport system is in operation. The overtravel of follower 35 will assure, therefore, that tape may be unwound and rewound off from and back onto hub 3 with the relative movement between capstan 9 and carriage 7 controlled solely by spring 10. It should be noted that spring 40 takes up the overtravel to assure that cables 19 and 33 remain properly seated in the various pulleys.

The above description has explained how the opening and closing of the cassette and the advancing and retracting of the supply reel is controlled by the two followers 27 and 35, respectively. In order to accomplish the desired result of preparing the tape system for operation, the various loading operations discussed above must be performed in the proper sequence. The sequencing of the cam follower movements is accomplished by a system of links, cam followers and cooperating slots in the stationary cam plate 28 and moveable side plate 41, a detailed discussion of which follows.

Knob 42 is attached to side plates 41 which are attached to one another by screws 43 through spacers 44 to form a sleeve freely slideable over cam bar 41 plate 28. Slots 41a and 41b determine the timing during the course of movement of knob 42 while slots 28c and 28d define the paths of cam followers 45 and 46, respectively. (See FIGS. 1 and 4.) Cam followers 45 and 46 are connected through links 47 and 48 to followers 27 and 35 respectively so that the nonlinear paths of cam followers 45 and 46 cause the horizontal movement of followers 27 and 35. Springs 49, stationarily attached at one end to support 50 and attached at the other end to cam follower 46 and at all times exerting a force greater than (A/B) × [(force exerted by springs 10) + (force exerted by spring 40)] assure that cam follower 46 is at all times pulled to the rear of the opening defined by slots 28d and 41b respectively. Likewise, springs 31 and 25 operate to assure that cam follower 45 is at all times pulled to the rear of the opening defined by slots 28c and 41a, respectively.

FIG. 1 shows the loading apparatus with the cassette tray halves 11 and 12 closed and the carriage 7 retracted and in proper orientation with the cassette tray to enable the loading of cassette 13 as described above. It should be noted that with the system in this condition the cables and link systems are adjusted so that cam followers 45 and 46 are at the extreme rear of the stationary slots 28c and 28d, respectively, and at the extreme front of the moveable slots 41a and 41b, respectively. Moving knob 42 forward initates movement of the cam followers 45 and 46 through the paths defined by slots 28c and 28d, respectively. Timing slots 41a and 41b program the sequence in which the cam followers 45 and 46 travel through their respective paths.

As can be seen, cam follower 45, linked to follower 27 which controls the opening of cassette tray halves 11 and 12, idles momentarily while knob 42 is slid forward due to the horizontal slot segment 41a1. Then cam follower 45 is contacted by vertical slot segment 41a2 and is pushed through slot 28c until reaching the forwardmost part of the slot. Cam follower 45 then being vertically aligned with horizontal slot segment 41a3 will idle throughout the remainder of the travel of knob 42.

Cam follower 46 idles during the entire cassette opening period due to horizontal slot segment 41b1. Then, cam follower 46 is contacted by vertical slot segment 41b2 and is pushed to the forwardmost end of slot 28d, thereby advancing supply tape pack 1 to allow the outermost tape layer to contact capstan 9 and also providing the overtravel of stop 39 to enable the unrestricted movement of carriage 7 (explained above). Finally, horizontal slot segment 41b3 allows cam follower 46 to idle momentarily as knob 42 is advanced to engage catch 51 with latch bar 52. This locking system maintains the loading system in the mode for permitting operation of the tape transport unit. At the end of such operation, the energization of solenoid 53 disengages the latch bar 52 and allows knob 42 to be retracted to reverse the above described process in order to retract carriage 7 and close cassette 13 to permit removal of the cassette from the unit.

A second locking mechanism (not shown) prevents the opening of the door in the system housing through which the cassette is inserted after beginning the loading process. It is understood that the lock can be of any configuration suitable to interlock the securing of the door with the movement of knob 42 from its rearmost position.

Second Embodiment

In a second embodiment of this invention a cable and cam system differing from that described in the first embodiment performs the same sequential functions of (1) locking the door through which the cassette was inserted, (2) opening the cassette and (3) advancing the supply reel into contact with the capstan.

Figure 6:
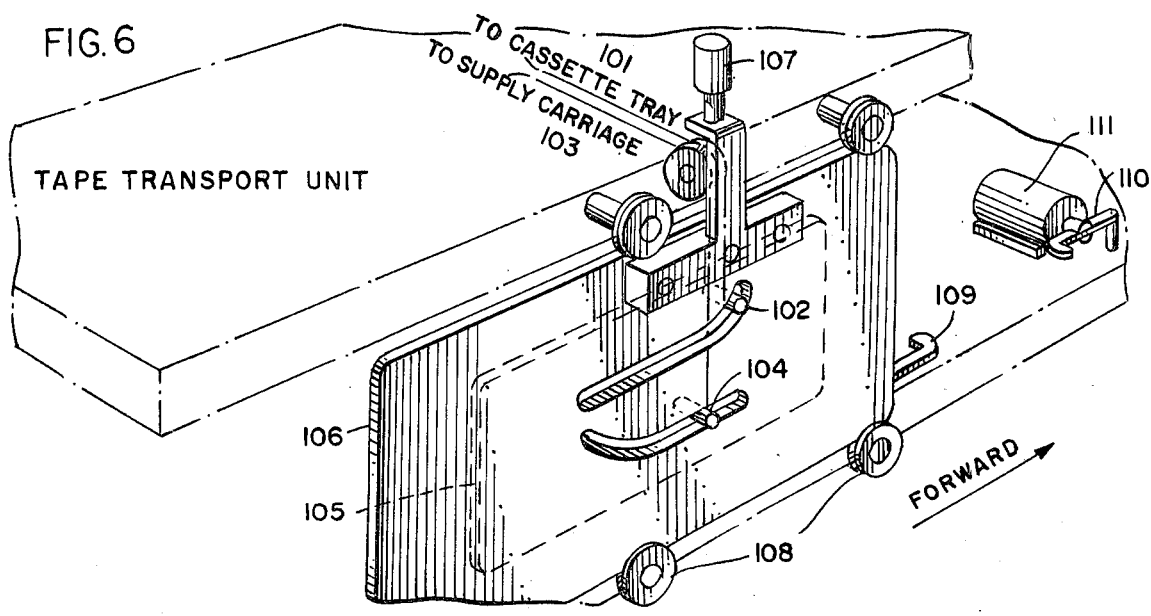
FIG. 6 is a perspective view of another embodiment of the loading apparatus shown with the tape transport indicated by dotted lines.

FIG. 6 shows the cam and cable system pictorially, with the tape transport unit shown in dotted lines only, it being identical to that shown in FIG. 1. Cable 101 extends between cassette tray halves (not shown) and cam follower 102 being directed by pulleys (not shown) and maintained in tension by springs (not shown) in the same manner as pulleys 22, 23, 24 and 26 and springs 25 and 31 directed and tensioned cable 20 in FIG. 1. Cable 103 extends between the supply carriage (not shown) and cam follower 104, also being directed and tensioned by pulleys (not shown) and springs (not shown) and having the functional equivalent (not shown) of stop 39 in FIG. 1.

Stationary cam plate 105 and sliding cam plate 106 are the functional equivalents of items 28 and 41, respectively, in FIGS. 1 and 4. Knob 107 is rigidly attached to sliding cam plate 106 and is used to slide the plate forward and backward (as referenced in FIG. 6) in the horizontal path defined by rollers 108. Cam followers 102 and 104 travel in the openings defined by co-operating slots in the stationary cam plate 105 and the sliding cam plate 106. Vertical slots 105a and 105b define the paths of cam followers 102 and 104, respectively, while timing slots 106a and 106b program the sequence in which cam followers 103 and 104 travel in their respective vertical paths. Spring forces (not indicated) act to keep cam followers 102 and 104 pulled to the top of the openings defined by slots 105a and 106a and 105b and 106b, respectively.

FIG. 6 shows the relative positions of the components with the cassette tray closed and the supply carriage retracted and in proper orientation with the cassette tray to enable the loading of the cassette. Note that the cable systems are adjusted so the cam followers 102 and 104 are at the top of stationary slots and at the front of the moveable slots. As knob 107 is moved from its rearmost position cam follower 102, which controls the opening of the cassette tray halves, immediately begins to move vertically downward in slot 105a due to slot segment 106a1. After cam follower 104 reaches the horizontal elevation of slot segment 106a2 it idles throughout the remainder of the travel of knob 107.

Cam follower 104, which controls the advancing of the supply carriage, idles during the cassette opening period due to horizontal slot segment 106b1. Then during the latter part of the travel of knob 107, cam follower is urged upward due to slot segment 106b2. A system (not shown) similar to that used in the first embodiment whereby overtravel of stop 39 facilitates the unrestricted movement of the supply carriage is similarly employed in this second embodiment. The final travel of knob 107 allows catch 109 to engage latch bar 110. This locking system, identical to one in the first embodiment, maintains the loading system in the mode for permitting operation of the tape transport unit, preventing reversal of the loading operations until solenoid 111 is actuated.

Also, as in the first embodiment, a door locking mechanism (not shown) prevents the opening of the door through which the cassette is inserted after beginning the loading process.

The major differences and similarities between the cam and cable system in the two embodiments discussed should be noted. One major difference is that while the first embodiment has cables 20 and 33 connected to followers 27 and 35 which are in turn connected to cam followers 45 and 46 through links 47 and 48, respectively, the second embodiment has cables 101 and 103 connected directly to cam followers 102 and 104. A second difference is that while the horizontal sliding of knob 42 causes the horizontal movement of followers 27 and 35, the horizontal sliding of knob 107 causes the vertical movement of cam followers 102 and 104. Beyond these differences, however, the embodiments are quite similar, if not identical.

Third Embodiment

In a third embodiment the manual operations are somewhat simplified over those required in the first and second embodiments. While in the latter embodiments the operator inserts the cassette 13 directly into the cassette tray halves 11 and 12 and pushes the cassette downward to snap hub 3 onto the supply shaft 5, the third embodiment (shown pictorially in FIG. 8) requires the insertion of a slightly modified cassette 201 into a pocket 202a, FIG. 8a of lid 202. Lid 202 is hinged to upper base 203 in such a manner and location that snapping it closed snaps hub 204 onto retracted supply shaft 205. In addition, the closing of lid 202 causes pins 206 to enter holes 201a in the bottom of cassette 202 to release the internal locking mechanism (not shown) in much the same manner as pins 18 enter holes 13a to unlock cassette 13 as it is lowered into place in the first and second embodiments.

Pins 206 are fixed to L-shaped arms 207 and 208, which are the functional equivalents of cassette tray halves 11 and 12. Arms 207 and 208 rotate at stationary pins 209 and 210, respectively. Pin 211 connects arms 207 and 208 through elongated holes (not shown) to synchronize their movement. Springs 212, each having one end attached to stationary brackets 203 act to urge arms 207 and 208 and, hence, pins 206, apart. As these pins 206 are urged apart, the now unlocked cassette 201 is also urged open due to the pins' engagement in holes 201a. With the moveable supply carriage 214 in the retracted position, however, bracket 215, which is fixedly attached to carriage 214, bears upon pin 211 to restrain its advancement and, hence, the separation of pins 206 under the forces of springs 212. At this point it should be noted that (1) the supply hub 204 with supply tape 216 wound thereon is snapped onto supply shaft 205 and (2) cassette 201 is unlocked and ready to open under the forces of springs 212 as carriage 214 is allowed to advance toward capstan 217 under the forces of springs 218.

Figure 7:
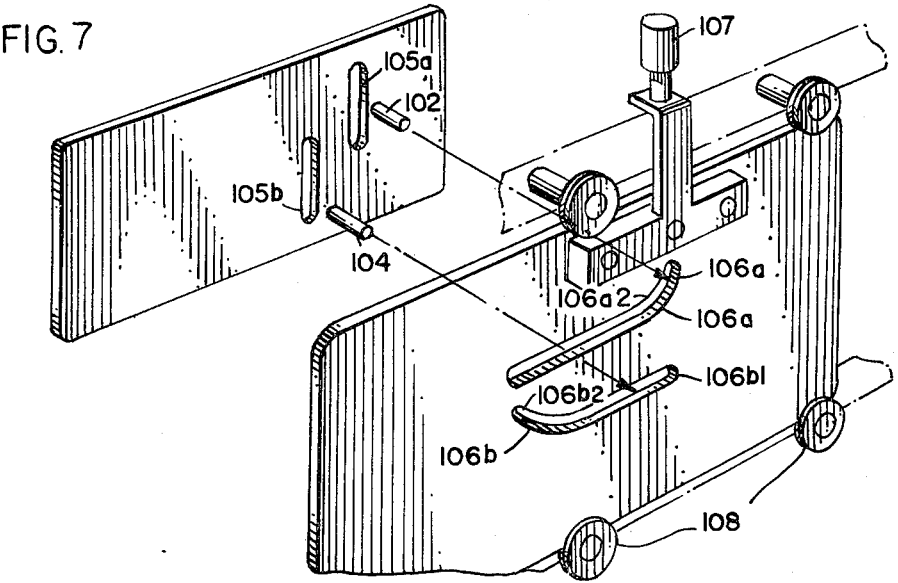
FIG. 7 is an exploded view of the components of the sliding actuator mechanism for the second embodiment.
Figure 9A:
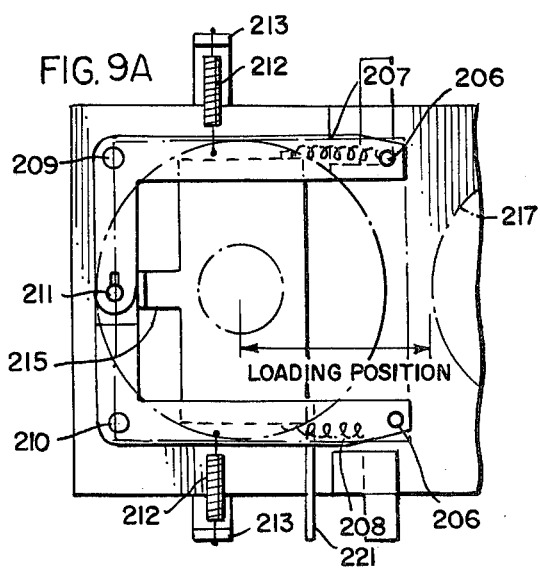
FIG. 9a is a plan view of the cassette of the third embodiment in loading position.
Figure 9B:
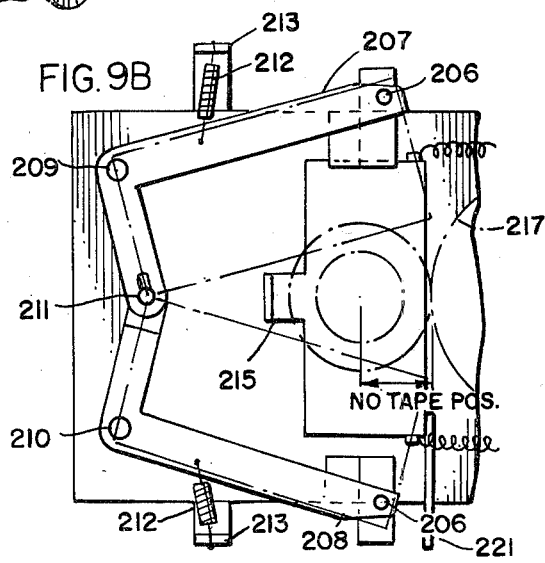
FIG. 9b is a plan view of the opened cassette of the third embodiment with the supply reel advanced to contact the capstan.

The movement of carriage 214 is restrained by stop 219 on cable 220. In an arrangement similar in principle to that utilized in the first and second embodiments, cable 220 is controlled by the sliding of knob 221. Briefly, since the details are set forth in the discussion of the first embodiments, cable 220 is connected to sliding plate 222. Knob 221 is fixedly attached to plate 222 and is used to move it back and forth in the path defined by rollers 223. As can be seen from FIG. 7, the sliding of knob 221 forward (as referenced by the drawing) will, through cable 220 and stop 219, allow the supply reel 216 to advance toward and contact capstan 217. An overtravel of knob 221 beyond that necessary to enable the full supply reel 216 to contact the capstan 217 assures that stop 219 will, under the force of spring 224, advance far enough to permit the unrestrained advancement and retraction of carriage 214 during the operation of the tape transport unit.

Catch 225 and latch 226 engage at the end of the travel of plate 222 to prevent the reversal of the above operations during the use of the tape transport unit. Actuation of solenoid 227 disengages catch 225 and latch 226 to enable the retraction of the supply reel 216 and the closing of cassette 201 after the tape has been rewound in hub 204 after use.

It should be noted that the cable system required in this embodiment is much simpler than those in the first and second embodiments due to the automatic opening of the cassette 201 under the forces of springs 212 as the carriage 214 is allowed to advance and, also, the automatic closing of the cassette 201 due to the action of bracket 215 on pin 211 as carriage 214 is retracted by the retraction of knob 221.

While the forms of the apparatuses herein described constitute preferred embodiments of the invention, it is to be understood that the invention is not limited to these precise forms of apparatuses, and that changes may be made therein without departing from the scope of the invention.

We claim:
1. A tape transport apparatus with loading means permitting a supply hub having a tape pack wound thereon to be manually snapped onto a supply shaft when retracted to a loading position, said tape pack being contained in a normally closed cassette of the type having means for providing a side opening during the tape transport operation, and said apparatus further including
 a drive capstan,
 a supply carriage having rotationally mounted thereon a take-up shaft carrying a take-up hub,
 means which, in the transporting operation of said apparatus, urge said two carriages towards said capstan,
 a combination cassette-opening and carriage-advancing actuator movable over a predetermined stroke,
 operating means which, incident to said supply hub being manually snapped onto said supply shaft, engage said cassette, and
 sequencing means controlled by said actuator in an initial portion of its stroke to cause said operating means and hence said opening-providing means to be actuated sufficiently to expose said tape pack for subsequent engagement by said capstan, and in a later portion of its stroke cause said supply carriage to be advanced to an operative position where said tape pack is contacted by said capstan.

2. A tape transport apparatus according to claim 1 wherein said cassette is of the type having two hinged half sections and having disengagable latching means normally latching said half sections together; wherein said apparatus includes two operating means which, incident to said supply hub being manually snapped onto said supply shaft, engage said two half sections of the cassette respectively; wherein said operating means are provided with unlocking means which, simultaneously with the engagement of said half sections of the cassette by said operating means, enter said half sections to disengage said latching means, thereby to cause said half sections to be unlatched from each other; and wherein said sequencing means control said operating means such that, in said initial portion of the stroke of said actuator, said two operating means, and hence said two half sections of the cassette, are caused to be spread apart sufficiently to expose said tape pack for subsequent engagement by said capstan.

3. A tape transport apparatus according to claim 2 wherein said actuator comprises at least one movable cam plate which is slidable relatively to a stationary cam plate; and wherein said sequencing means comprises cam follower means guided by openings of predetermined shape in said movable and stationary cam plates, and a first cable system interposed between said cam follower means and said operating means and a second cable system interposed between said cam follower means and said supply carriage.

4. a tape transport apparatus according to claim 2 wherein cable means are interposed between said actuator and said supply carriage; wherein said two operating means comprise two generally L-shaped pivoted arms, respectively; wherein there are provided spring means urging said arms into spread apart position; and wherein said sequencing means comprise restraining means on said supply carriage which bear on said arms adjacent their pivot to keep said arms from being spread apart, under the action of said springs, while said supply carriage is in said retracted position and which are disengaged from said arms during the initial portion of the advance of said supply carriage, so that said cassette is permitted to open before said supply carriage reaches said operative position.

5. A tape transport apparatus according to claim 4 wherein adjacent the loading position of said supply shaft there is hinged to said apparatus a lid provided with a pocket for end-wise insertion of said cassette therein; said lid while in open position, permitting said cassette to be received in said pocket and, when manually depressed into closed position with said cassette therein, causing the hub of the tape pack contained in said cassette to be snapped onto said supply shaft.

6. A tape transport apparatus according to claim 1 wherein said sequencing means comprise a motor and lead screw arrangement for advancing and retracting said supply carriage.

* * * * *

UNITED STATES PATENT AND TRADEMARK OFFICE
CERTIFICATE OF CORRECTION

PATENT NO. : 3,980,253
DATED : September 14, 1976
INVENTOR(S) : BURDORF et al

It is certified that error appears in the above-identified patent and that said Letters Patent are hereby corrected as shown below:

In the Heading, insert -- Assignee: BASF Aktiengesellschaft, Ludwigshafen (Rhine), Germany --

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*